United States Patent [19]

Al-Sheikh

[11] Patent Number: 5,016,454
[45] Date of Patent: May 21, 1991

[54] MOTOR VEHICLE SUPPLEMENTARY LOCKING MECHANISM

[76] Inventor: Edward G. Al-Sheikh, 466 W. Hollywood, Detroit, Mich. 48203

[21] Appl. No.: 218,579

[22] Filed: Jul. 13, 1988

[51] Int. Cl.⁵ .................. B60R 25/02; B60R 25/06
[52] U.S. Cl. ........................... 70/185; 70/247;
   70/252; 74/483 K; 74/552; 180/287
[58] Field of Search .............. 70/245, 184–186,
   70/252, 249–251, 192, 247; 74/552, 483 K;
   180/287

[56] References Cited

U.S. PATENT DOCUMENTS

| | | | |
|---|---|---|---|
| 1,382,250 | 6/1921 | Scott | 180/287 X |
| 1,469,401 | 10/1923 | Willett | 70/185 |
| 1,471,553 | 10/1923 | Fell | 70/252 |
| 1,557,896 | 10/1925 | Sworaski | 70/185 |
| 1,674,395 | 6/1928 | Hershey | 70/185 |
| 1,688,568 | 10/1928 | Welman | 70/185 |
| 2,011,268 | 8/1935 | Carlson | 70/252 |
| 3,570,286 | 3/1971 | Rohrbough | 70/185 X |
| 3,985,009 | 10/1976 | Lipschutz | 70/252 |

FOREIGN PATENT DOCUMENTS

| | | | |
|---|---|---|---|
| 441973 | 11/1948 | Italy | 70/185 |
| 705424 | 3/1954 | United Kingdom | 70/186 |

*Primary Examiner*—Lloyd A. Gall
*Attorney, Agent, or Firm*—George R. Royer

[57] ABSTRACT

A supplementary locking mechanism for a motor vehicle which mechanism is adapted to lock concurrently and simultaneously both the steering column and the transmission shift with the purpose of attempting to prevent theft or unauthorized use of a motor vehicle, such device and apparatus comprising a locking mechanism based on a retractible trigger mechanism that reciprocally moves a longitudinally extending finger-like ratchet member that is adapted to be inserted simultaneously through both the steering column and the transmission shift column so as to lock two colums at the same time to the outer enclosing cylindrical frame.

1 Claim, 1 Drawing Sheet

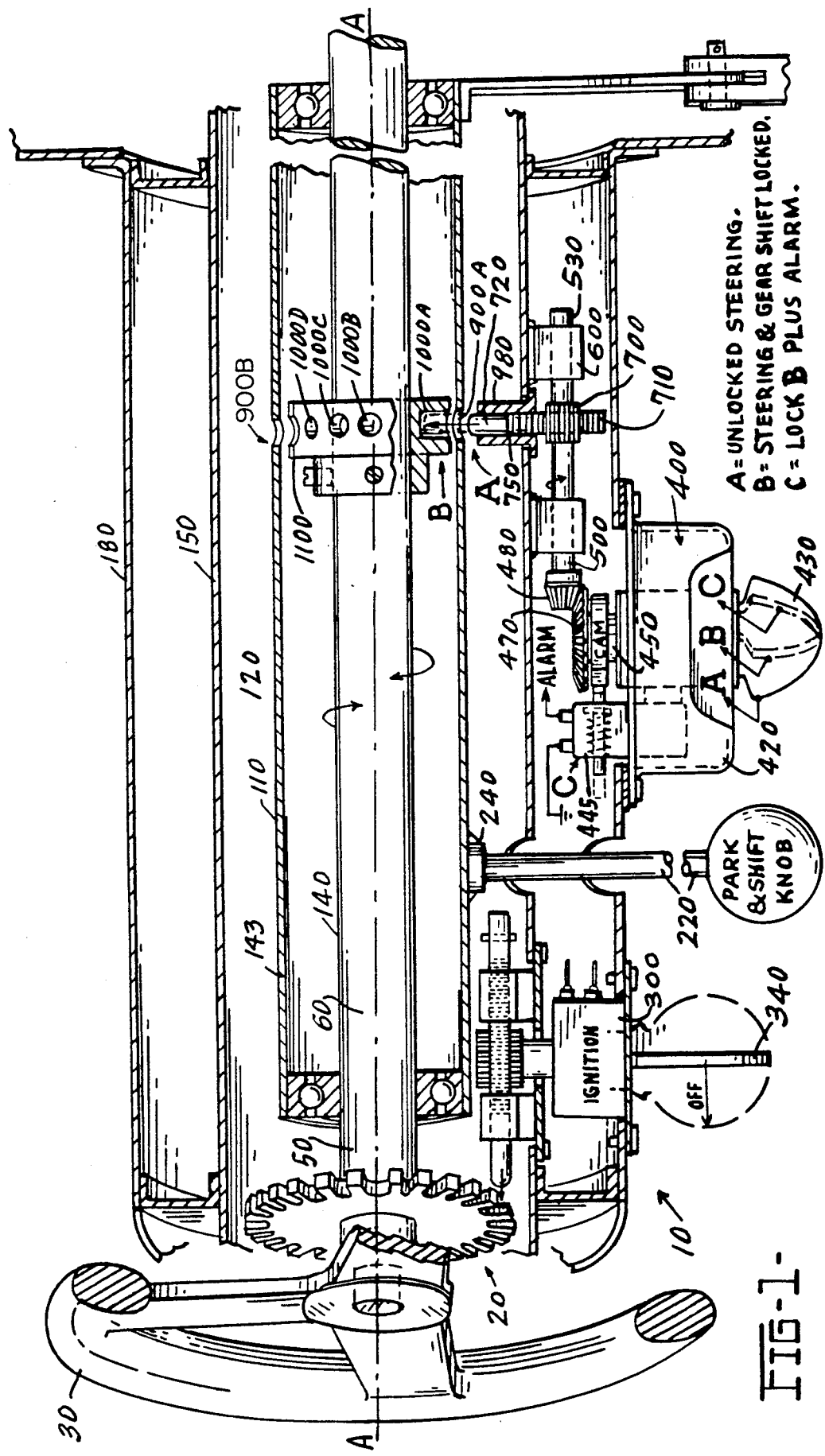

MOTOR VEHICLE SUPPLEMENTARY LOCKING MECHANISM

OBJECTS

The following are objects of the subject invention:

It is an object of the subject invention to provide an improved safety locking mechanism for an automobile;

It is also an object of the subject invention to provide an improved security device to help prevent theft or unauthorized use of a motor vehicle;

Yet another object of the subject invention is to provide an improved auxiliary locking device for an automobile;

Still another object of the subject invention is to provide an improved apparatus to prevent theft of a motor vehicle by preventing short circuit manipulation of the basic electrical ignition system;

Other and further objects of the subject invention will become apparent from a reading of the following description in conjunction with the claims and drawings.

DRAWINGS

In the drawings:

FIG. 1 is a perspective view in section of the subject apparatus;

DESCRIPTION OF GENERAL EMBODIMENT

A supplemental locking mechanism for a motor vehicle which mechanism is adapted to lock concurrently and simultaneously both the steering column and the transmission shift with the purpose of attempting to prevent theft or unauthorized use of a motor vehicle, such device and apparatus comprising a locking mechanism based on a retractible trigger mechanism that reciprocally moves a longitudinally extending finger-like ratchet member that is adapted to be inserted simultaneously through both the steering column and the transmission shift column so as to lock two columns at the same time to the outer enclosing cylindrical frame.

DESCRIPTION OF PREFERRED EMBODIMENT

In describing the preferred embodiment of the subject invention, it is to be stressed that by setting forth one particular embodiment as a preferred embodiment, it is not to be considered as limiting the scope of the subject invention to such embodiment and the claims are therefore not to be limited in their construction by such description.

Referring now to the drawings in which a preferred embodiment of the subject invention is shown, and particularly and initially to FIG. 1, the steering column assembly 10 and the cylindrical support shaft assembly 20 for such steering column is shown in schematic fashion, with various appurtenances and components being shown in other than normal proportionate relationship to one another in order to aid in the understanding of the drawing and the accompanying description. A perusal of FIG. 1 reveals that the steering column assembly 20 is basically and generally a multiple assembly comprised of a plurality of cylindrical members concentrically disposed along a common central axis A—A. At the head of the assembly 20 is a steering wheel 30 of conventional circular configuration, through the center of which is aligned axis A—A and about which latter axis the steering wheel is moved for the intended steering control functions. In most state of the art automobile systems, the steering wheel and column are locked or otherwise fixed against such circular movement by a locking system integrated with the ignition switching system. The subject invention is conceived to supplement such ignition locking system.

As can be seen from FIG. 1, the central member of the assembly 20 is longitudinally extending cylindrical member 50, which central member comprises the steering column 60. Steering column 60 is linked to the steering assembly of the automobile, not shown, and functions by its rotative capacity, about longitudinal central axis A—A, to transmit steering signals by its arcuate movements from the steering wheel to control unit of the steering assembly so as to effect steering changes in the front wheel assembly. In the "park" position in most automatic transmission equipped automobiles, the steering column 60 is locked into a position when the car is stopped and the ignition turned off. While in such locked position the steering column 60, as is well known in the art, cannot be moved, and one of the primary objects of the subject locking system, as described herein, is to keep both steering column and transmission column in their locked "park" position, so that an extra locking method is employed to provide double-locking protection to prevent tampering and a resultant unauthorized use of the motor vehicle.

Attention is directed again to FIG. 1, and as can be seen, the centrally located steering column 60 is concentrically surrounded by longitudinally extending shift column 110. As can be determined, the shift column 110 is a hollow cylindrical member having a diameter slightly larger than that of the steering column 60, so that there is a resultant spatial area 120 between the outer circumferential surface 140 of the steering column 60 and the inner circumferential surface of the shift column 110. Shielding the outer circumferential surface 143 of the shift column 110 is a first tubular covering member 150. The latter tubular covering member is a hollow cylindrical member, which is concentrically mounted, as aligned along central longitudinal axis A—A, which shields the shift column 110. In some motor vehicles, as shown in FIG. 1, a second outer covering 180 in the form of a tubular member is concentrically mounted over the first covering member 143. The first covering member 150 and the secondary covering member 180 are rigidly fixed, while the steering column 60 and the shift column 110 are rotatable about axis A—A. A transmission control lever 220, which is a longitudinally extending member, the inner end 240 of which is rigidly affixed to the outer circumferential surface of the shift column 110. As can be seen in FIG. 2, the transmission lever control 220 is adapted to be moved through the various shift positions, as shown in the sequential phantom positions descending downward and clockwise as seen in FIG. 2. In the bottom portion of FIG. 2 is shown schematically the corresponding transmission shift positions on the bottom of the shift column 110, as indirectly connected to the transmission, not shown. Once the ignition key 340 is turned to the on or engaged position, the transmission control lever is unlocked from the park position and the steering column 60 and the transmission shift column 110 are free to be rotated. This latter structural arrangement functions as the basic locking and security system to prevent unauthorized use of the automobile.

The secondary locking system utilized herein incorporates features of the subject invention, with such secondary system including a separate locking unit 400 aside from the ignition locking system, as seen in FIG. 1. Secondary locking unit 400 is, in turn, comprised of a secondary lock member 420, schematically and diagramatically shown in FIG. 1 with a compatible key member 430 adapted to be inserted into the insert position, as shown.

As shown in FIG. 1 the secondary locking unit 400 is positioned in the second cylindrical covering 180 and the lock tumbler, not shown, is actuated by an appropriate turning movement of key 430 causes the cam shaft 450, just inside the inner circumference of covering 180, to turn the cam member 470, integrally and concentrically affixed on the end of such shaft 450, with the cam member 470 rotated as a result through a limited circumferential movement. A cam follower 480 is geared to the cam member 470 and, as seen in FIG. 1, cam follower 480 is mounted and geared to the cam in a perpendicular manner.

As shown in the drawings, particularly FIG. 1, the cam shaft follower 480 is integrally and radially affixed to a longitudinal shaft 500 which extends, in the spatial area between covering 180 and covering 150, parallel to the outer circumferential surface of the shift tube 110, as well as being parallel to axis A—A, as shown in FIG. 1. The shaft 500 extends in this parallel manner to a position shown in FIG. 1. As seen, the distal end 530 of the shaft 500 is affixed in a bearing mount 600 which is in turn affixed to the outer circumference of the first cylindrical covering member 150, as shown.

A ratchet gear member 700 is affixed on a portion of the shaft member, with such ratchet gear member 700 being circumferentially and concentrically disposed around the outer circumference of the shaft 500. Engaged in a tangentially perpendicular manner against such ratchet gear 700 is longitudinally extending ratchet member 750, which ratchet member is adapted to reciprocally slide back and forth in engagement against the outer periphery of the ratchet member, as shown. Thus, as the shaft 500 moves either clockwise or counterclockwise, the ratchet member will move radially inwardly or outwardly relative to central axis A—A.

On the inner radial end of the ratchet member 710 is a cylindrical finger-like extension 720, generally of a smooth outer surface and which is cylindrical in shape and configuration. As shown in FIG. 1, this finger-like configuration is adapted to be reciprocally insertible into opening 900A in the covering 150, as guided through sleeve 980 integrally disposed on the inner circumference of the covering 150.

As further shown in FIG. 1, the shift column has a plurality of circular openings 900A, 900B . . . 900G disposed in an equal distant manner completely around the circumference of the shift tube 110. These openings 900A . . . 900G are disposed adjacent the distal end of finger 720 so that the end of such finger is able to move into one of such openings and thereby lock the shift column 110 against rotative movement.

As can be further seen in FIG. 1, the outer circumference of the steering column 60 is provided with a plurality of equally spaced openings 1000A, 1000B, 1000C . . . 1000G. These openings are preferably formed into a collar 1100, which is integrally disposed adjacent the position of the openings 900A . . . 900G on the shift column. These openings 1000A . . . 1000G are circular and one, at a time, is adapted to also receive the distal end of the finger 720 once it is inserted through one of the openings 900A . . . 900G in the shift column.

Thus, as can be seen from the drawings, when the key 430 is turned in the lock 400, to lock the subject mechanism, longitudinal shaft 500 is rotated which in turn causes the finger 720 to be moved radially inwardly through one of the openings 900A . . . 900G in the shift column 110 and thence into one of the openings 1000A . . . 1000G in the steering column 60. This functions to lock both the steering column and shift column together simultaneously as an additional security feature.

In summary, the subject invention is a supplemental locking apparatus for a motor vehicle having a steering column and a shift column, each having a longitudinal central axis partially encased in an outer cylindrical sleeve, adapted to cooperatively and simultaneously lock the steering column and the shift column against rotational movement, such apparatus comprising in combination an auxiliary locking unit integrally positioned on the exterior periphery of the outer cylindrical sleeve such locking unit having receptacle means to receive a male key member to actuate such locking unit, and having cylindrical shaft means within such locking unit and rotatably movable by actuation of such locking unit, such shaft means extending through such cylindrical shaft being disposed in a direction that is perpendicular to the longitudinal central axis of such shift column and a position that is external to the shift column, and a power transfer means disposed on a portion of such cylindrical shaft means, such means adapted to transfer rotational movement of such cylindrical shaft means, with a longitudinally extending member adapted for reciprocating movement geared to such power transfer means, such longitudinal member having a finger member on the end thereof which is disposed away from the power transfer means, and having a plurality of openings disposed in the outer circumference of the shift column, which openings are adapted to receive the end of the finger member in reciprocating fashion, such openings extending through the shift column, and having a plurality of openings disposed in the steering column, such openings being adapted to receive in a reciprocating manner the end of such finger member. Alternately stated, the subject invention is a supplemental locking apparatus for a motor vehicle having a steering column and a shift column, each having a longitudinal central axis partially encased in an outer cylindrical sleeve, adapted to cooperatively and simultaneously lock the steering column and the shift column against rotational movement, wherein such steering column and shift columns have a plurality of openings therein, such apparatus comprising a locking member having a finger member that is reciprocally moveable so as to be insertible upon actuation of the locking apparatus to be simultaneously inserted through one of the openings in the shift column and one of the openings in the steering column.

I claim:
1. A supplemental locking apparatus for a motor vehicle having a steering column and a shift column, each having a longitudinal central axis partially encased in an outer cylindrical sleeve, adapted to cooperatively and simultaneously lock the steering column and the shift column against rotational movement, said apparatus comprising:
 (a) an auxiliary locking unit integrally positioned on the exterior periphery of the outer cylindrical sleeve, said locking unit having receptacle means to receive a male key member to actuate such locking unit;

(b) first cylindrical shaft means within said locking unit and rotatably movable by actuation of said locking unit, said first cylindrical shaft means extending through said outer cylindrical sleeve and being disposed in a direction that is perpendicular to the longitudinal central axis of said shift column and a position that is external to the shift column;

(c) a power transfer means disposed on a portion of said first cylindrical shaft means, said means adapted to transfer rotational movement of said first cylindrical shaft means, said power transfer means comprising a concentric cam gear on the inner end of such first cylindrical shaft means, and a follower gear that transfers any motion of the first cylindrical shaft means in a perpendicular direction to said cylindrical shaft means;

(d) second cylindrical shaft means concentrically and coaxially mounted to said follower gear, said second cylindrical shaft means having gear means on a portion of its outer surface;

(e) longitudinally extending ratchet member, adapted for reciprocating movement and geared to the gear means on said second cylindrical shaft means and said longitudinally extending ratchet member having a finger member on the end thereof which is disposed away from the power transfer means, and inwardly towards the shift column;

(f) a plurality of openings disposed in the outer circumference of the shift column, which openings are adapted to receive the end of the finger member in reciprocating fashion, said openings extending through the shift column;

(g) a plurality of openings disposed in the steering column, said openings being also adapted to receive in a reciprocating manner the end of said finger member.

* * * * *